US011424867B2

(12) United States Patent
Lei et al.

(10) Patent No.: US 11,424,867 B2
(45) Date of Patent: Aug. 23, 2022

(54) DATA ACKNOWLEDGEMENT IN A WIRELESS COMMUNICATION SYSTEM

(71) Applicant: Lenovo Innovations Limited (Hong Kong), Hong Kong (CN)

(72) Inventors: Haipeng Lei, Beijing (CN); Zukang Shen, Beijing (CN); Xiaodong Yu, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 18 days.

(21) Appl. No.: 17/161,478

(22) Filed: Jan. 28, 2021

(65) Prior Publication Data

US 2021/0152288 A1 May 20, 2021

Related U.S. Application Data

(63) Continuation of application No. 16/430,264, filed on Jun. 3, 2019, now Pat. No. 10,938,518, which is a continuation of application No. 15/406,334, filed on Jan. 13, 2017, now Pat. No. 10,341,060.

(30) Foreign Application Priority Data

Jan. 13, 2016 (WO) ................ PCT/CN2016/070835

(51) Int. Cl.
*H04L 1/16* (2006.01)
*H04L 1/18* (2006.01)
*H04L 1/00* (2006.01)

(52) U.S. Cl.
CPC .......... *H04L 1/1657* (2013.01); *H04L 1/0001* (2013.01); *H04L 1/1854* (2013.01); *H04L 1/1864* (2013.01)

(58) Field of Classification Search
None
See application file for complete search history.

(56) References Cited

U.S. PATENT DOCUMENTS

| 2008/0062944 | A1 | 3/2008 | Smith et al. |
| 2012/0044895 | A1 | 2/2012 | Cho et al. |
| 2013/0170428 | A1 | 7/2013 | Morioka et al. |
| 2014/0064159 | A1 | 3/2014 | Larsson et al. |
| 2014/0328258 | A1 | 11/2014 | Cheng et al. |

(Continued)

FOREIGN PATENT DOCUMENTS

| CN | 101567775 A | 10/2009 |
| CN | 101998539 A | 3/2011 |

(Continued)

OTHER PUBLICATIONS

Huawei Hisilicon, "Remaining issues for dynamic adaptation of PUCCH formats for HARQ-ACK feedback", 3GPP TSG RAN WG1 Meeting #83, R1-156453, Anaheim, USA, Nov. 15-22, 2015, 3 pages.

*Primary Examiner* — Otis L Thompson, Jr.
(74) *Attorney, Agent, or Firm* — Kunzler Bean & Adamson

(57) ABSTRACT

Apparatuses, methods, and systems are disclosed for data acknowledgment. One apparatus includes a transmitter that transmits data to a device. The apparatus may include a processor that determines a response window having multiple subframes for receiving an acknowledgement corresponding to the data. The apparatus may include a receiver that receives the acknowledgement within the response window.

20 Claims, 6 Drawing Sheets

(56) References Cited

U.S. PATENT DOCUMENTS

| | | |
|---|---|---|
| 2016/0072617 A1 | 3/2016 | Nagata et al. |
| 2016/0174259 A1* | 6/2016 | Mukherjee ............... H04L 1/08 370/280 |
| 2016/0174263 A1 | 6/2016 | Webb |
| 2016/0182213 A1 | 6/2016 | Golitschek Edler von Elbwart et al. |
| 2016/0278048 A1* | 9/2016 | Nory ................. H04L 27/0006 |
| 2016/0330630 A1 | 11/2016 | Yoo et al. |
| 2016/0359589 A1 | 12/2016 | Belleschi et al. |
| 2017/0105207 A1 | 4/2017 | Fan et al. |
| 2017/0126346 A1* | 5/2017 | Chendamarai Kannan ................. H04W 72/0413 |
| 2017/0142705 A1* | 5/2017 | Chendamarai Kannan ................. H04L 1/1854 |
| 2017/0222749 A1 | 8/2017 | Dinan |
| 2017/0230971 A1 | 8/2017 | Lee |
| 2017/0272200 A1 | 9/2017 | Dinan |
| 2017/0280448 A1 | 9/2017 | Takeda et al. |
| 2017/0332358 A1 | 11/2017 | Park et al. |
| 2018/0020365 A1 | 1/2018 | Xiong et al. |
| 2018/0035303 A1 | 2/2018 | Bhorkar et al. |
| 2018/0242276 A1 | 8/2018 | Patel et al. |
| 2018/0343047 A1 | 11/2018 | He et al. |
| 2018/0376490 A1* | 12/2018 | Lunttila ................ H04L 5/0055 |
| 2018/0376504 A1 | 12/2018 | Si et al. |
| 2020/0044791 A1 | 2/2020 | Tsai et al. |

FOREIGN PATENT DOCUMENTS

| | | |
|---|---|---|
| CN | 102025467 A | 4/2011 |
| CN | 102347823 A | 2/2012 |
| CN | 102647261 A | 8/2012 |
| CN | 104160767 A | 11/2014 |
| CN | 105101446 A | 11/2015 |
| CN | 105103624 A | 11/2015 |

* cited by examiner

DATA ACKNOWLEDGEMENT IN A WIRELESS COMMUNICATION SYSTEM

CROSS REFERENCE TO RELATED APPLICATIONS

This application is a continuation of application Ser. No. 16/430,264 filed on Jun. 3, 2019, which is a continuation of application Ser. No. 15/406,334 filed on Jan. 13, 2017, all of which are hereby incorporated by reference in their entirety.

FIELD

The subject matter disclosed herein relates generally to wireless communications and more particularly relates to data acknowledgement in a wireless communication system.

BACKGROUND

The following abbreviations are herewith defined, at least some of which are referred to within the following description.
3GPP Third Generation Partnership Project
ACK Positive-Acknowledgment
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CSS Common Search Space
CWS Contention Window Size
DCI Downlink Control Information
DL Downlink
eCCA Enhanced Clear Channel Assessment
eNB Evolved Node B
EPDCCH Enhanced Physical Downlink Control Channel
ETSI European Telecommunications Standards Institute
FBE Frame Based Equipment
FDD Frequency Division Duplex
FDMA Frequency Division Multiple Access
FEC Forward Error Correction
HARQ Hybrid Automatic Repeat Request
LAA Licensed Assisted Access
LBE Load Based Equipment
LBT Listen-Before-Talk
LTE Long Term Evolution
MCL Minimum Coupling Loss
MCS Modulation and Coding Scheme
MU-MIMO Multi-User, Multiple-Input, Multiple-Output
NACK or NAK Negative-Acknowledgment
OFDM Orthogonal Frequency Division Multiplexing
PCell Primary Cell
PBCH Physical Broadcast Channel
PDCCH Physical Downlink Control Channel
PDSCH Physical Downlink Shared Channel
PHICH Physical Hybrid ARQ Indicator Channel
PRACH Physical Random Access Channel
PRB Physical Resource Block
PUCCH Physical Uplink Control Channel
PUSCH Physical Uplink Shared Channel
QoS Quality of Service
QPSK Quadrature Phase Shift Keying
RAR Random Access Response
RRC Radio Resource Control
RX Receive
SC-FDMA Single Carrier Frequency Division Multiple Access
SCell Secondary Cell
SCH Shared Channel
SIB System Information Block
SINR Signal-to-Interference-Plus-Noise Ratio
SR Scheduling Request
TB Transport Block
TBS Transport Block Size
TDD Time-Division Duplex
TDM Time Division Multiplex
TX Transmit
UCI Uplink Control Information
UE User Entity/Equipment (Mobile Terminal)
UL Uplink
UMTS Universal Mobile Telecommunications System
WiMAX Worldwide Interoperability for Microwave Access In wireless communications networks, DL TBs may be carried on the PDSCH. A maximum of two TBs may be transmitted on PDSCH in one serving cell and in a subframe. "HARQ-ACK" may represent collectively the Positive Acknowledge ("ACK") and the Negative Acknowledge ("NAK"). ACK means that a TB is correctly received while NAK means a TB is erroneously received.

HARQ-ACK feedback bits corresponding to a PDSCH may be transmitted either on the PUCCH or on the PUSCH. For 3GPP Release 8 LTE FDD, HARQ-ACK feedback bits corresponding to PDSCH received in subframe n−4 are transmitted in subframe n. See 3GPP TS36.213 v12.6.0. Furthermore, for 3GPP Release 8 LTE TDD, HARQ-ACK feedback bits corresponding to PDSCH received in subframe n−k, where k belongs to the set K, are transmitted in subframe n. It should be noted that for LTE TDD, the elements in set K depends on the TDD UL/DL configuration, as well as the subframe index n, as shown in Table 1.

TABLE 1

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The LTE TDD UL/DL configurations are shown in Table 2. It should be noted that in Table 2, "D" represents a DL subframe, "U" represents an UL subframe, and "S" represents a special subframe. The timing relationship between the subframe containing the PDSCH and the subframe containing the corresponding HARQ-ACK feedback may be referred to as the HARQ timing.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | s | u | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

A frame structure for LTE FDD may be used in certain configurations. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{DL} N_{sc}^{RB}$ subcarriers and $N_{symb}^{DL}$ OFDM symbols, where $N_{RB}^{DL}$ is number of RBs in the DL (which is dependent on the transmission bandwidth of a cell); $N_{sc}^{RB}$ is the number of subcarriers in each RB; and each subcarrier occupies a certain frequency of size $\Delta f$. The values of $N_{sc}^{RB}$, $\Delta f$, and $N_{symb}^{DL}$ may depend on a cyclic prefix as shown in Table 3.

TABLE 3

| Configuration | | $N_{sc}^{RB}$ | $N_{symb}^{DL}$ |
|---|---|---|---|
| Normal Cyclic Prefix | $\Delta f = 15$ kHz | 12 | 7 |
| Extended Cyclic Prefix | $\Delta f = 15$ kHz | | 6 |
| | $\Delta f = 7.5$ kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain configurations, carrier aggregation may be used such that more than one carrier may be aggregated by a UE to improve a transmission data rate. A UE may be able to aggregate a different number of carriers in the downlink and the uplink. For an RRC_CONNECTED UE (e.g., a UE in which an RRC connection has been established), each of the aggregated carriers may be a serving cell for the UE. Among the multiple aggregated serving cells, only one cell may be the primary cell while the other cells are secondary cells. In some configurations, PUCCH may be transmitted on both the primary cell and a secondary cell. Accordingly, PUCCH overhead may be offloaded from the primary cell to a secondary cell.

In some configurations, as part of carrier aggregation, aggregation of serving cells on a licensed spectrum and an unlicensed spectrum is supported for DL transmission. In such configurations, the serving cells in the unlicensed spectrum may only be secondary cells to a UE. The operation on the unlicensed carriers is assisted by the operation on the licensed carriers, hence the name licensed assisted access ("LAA").

In certain configurations, LAA includes UL support for LAA secondary cell operation in an unlicensed spectrum. LAA may also allow for fair coexistence between Wi-Fi and LAA and fair coexistence between different LAA systems. Coexistence measures may still allow efficient operation of all coexisting technologies. PUCCH transmission may be performed on unlicensed carriers to offload PUCCH overhead from licensed carriers to unlicensed carriers. In order to support dual connectivity for LAA operation (e.g., the network node hosting the licensed carriers and the network node hosting the unlicensed carriers are geographically non-collocated and connected with non-ideal backhaul), PUCCH transmission in unlicensed carriers may be supported.

In various configurations, if there are a large number of carriers in the unlicensed spectrum and a limited number of carriers in licensed spectrum, it may be useful to offload some UCI from the licensed spectrum to the unlicensed spectrum. In some situations, the channel quality of the unlicensed spectrum may be worse than the channel quality of the licensed spectrum and there may be unpredictable channel access of unlicensed spectrum. Accordingly, HARQ-ACK corresponding to PDSCH in licensed spectrum may be transmitted in the licensed spectrum. Furthermore, HARQ-ACK transmitted in the uplink on an unlicensed spectrum may correspond to PDSCH transmitted on the unlicensed spectrum. This may be facilitated by eNB configuration.

As may be appreciated, LBT may be performed before transmissions on an unlicensed spectrum to facilitate fair coexist with other wireless systems on the same unlicensed spectrum. Moreover, for HARQ-ACK transmissions on an unlicensed carriers, LBT may be performed before actual HARQ-ACK transmissions. After an LBT is successful, a UE may start a HARQ-ACK transmission in the LAA uplink subframe according to a DL HARQ timing relationship. In contrast, HARQ-ACK transmission corresponding to DL transmission in an LAA secondary cell may not be transmitted on an LAA secondary cell uplink in response to a failed LBT for uplink channel access. Not transmitting a HARQ-ACK transmission may reduce DL throughput performance.

BRIEF SUMMARY

Apparatuses for data acknowledgment are disclosed. Methods and systems also perform the functions of the apparatus. In one embodiment, the apparatus includes a transmitter that transmits data to a device. In certain embodiments, the apparatus includes a processor that determines a response window having multiple subframes for receiving an acknowledgement corresponding to the data. In various embodiments, the apparatus includes a receiver that receives the acknowledgement within the response window.

In one embodiment, the multiple subframes are consecutive subframes. In a further embodiment, the multiple subframes are non-consecutive subframes. In some embodiments, the processor determines a time period of delay from the subframe where the data is transmitted to a first subframe within the response window. In certain embodiments, a number of subframes of the response window is fixed or configured by higher layer signaling. In another embodiment, the acknowledgment includes a positive acknowledgement ("ACK") or a negative acknowledgement ("NAK").

A method for data acknowledgment, in one embodiment, includes transmitting data to a device. In various embodiments, the method may include determining a response window including multiple subframes for receiving an acknowledgement corresponding to the data. In some embodiments, the method includes receiving the acknowledgement within the response window.

In one embodiment, an apparatus includes a receiver that receives data. In various embodiments, the apparatus may include a processor that determines a response window including multiple subframes for transmitting an acknowledgement corresponding to the data. The apparatus may also include a transmitter that transmits the acknowledgement within the response window.

In certain embodiments, the processor performs a LBT before transmitting the acknowledgement. In such embodiments, the transmitter transmits the acknowledgement in a subframe within the response window in which LBT is successful. In various embodiments, the transmitter transmits the acknowledgement in a subframe within the response window immediately following a subframe in which LBT is successful. In some embodiments, a random backoff counter is generated for a LBT in a first subframe within the response window and continued to be counted down for the LBT in a second subframe within the response window.

In one embodiment, the processor determines multiple response windows with each response window of the multiple response windows corresponding to a respective portion of the data. In such an embodiment, the transmitter transmits an acknowledgement for each respective portion of the data within a corresponding response window of the multiple response windows. In certain embodiments, the transmitter transmits the acknowledgement for each respective portion of the data together in a subframe after successfully performing a LBT. In some embodiments, the transmitter transmits a common acknowledgement for each respective portion of the data in a subframe after successfully performing a LBT.

Another method for data acknowledgment, in one embodiment, includes receiving data. In various embodiments, the method includes determining a response window having multiple subframes for transmitting an acknowledgement corresponding to the data. In some embodiments, the method includes transmitting the acknowledgement within the response window.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
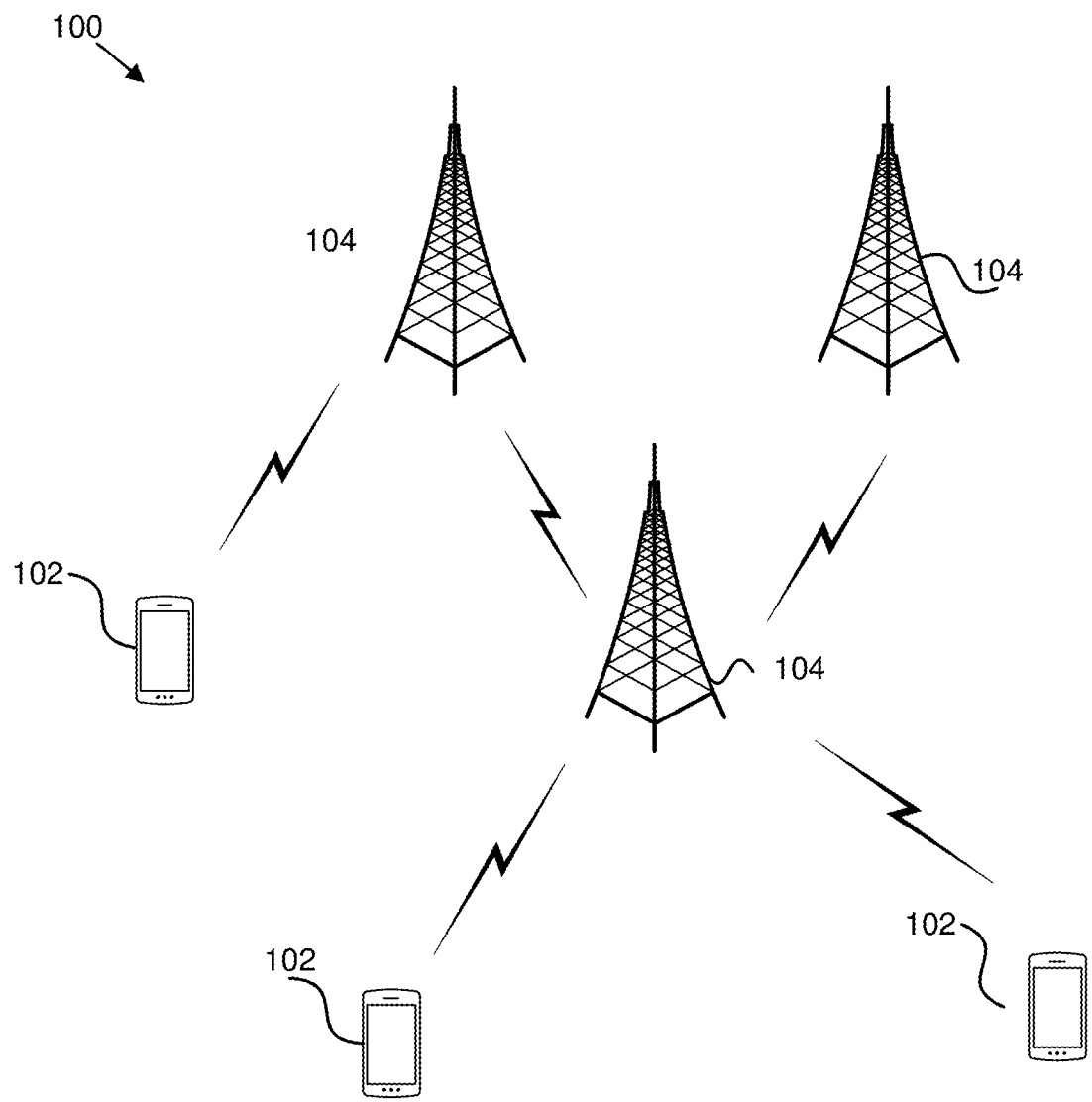
FIG. 1 is a schematic block diagram illustrating one embodiment of a wireless communication system for data acknowledgment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for data acknowledgment. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may transmit to a device (e.g., remote unit 102). In such an embodiment, the base unit 104 may determine a response window having multiple subframes for receiving an acknowledgement corresponding to the data. The base unit 104 may receive the acknowledgement from the device within the response window. Accordingly, the acknowledgement may be received during a time period longer than a single subframe to facilitate multiple attempts by the device to transmit the acknowledgement to the base unit 104 because of times in which LBT may be unsuccessful.

In another embodiment, a remote unit 102 may receive data from a device (e.g., base unit 104). In such an embodiment, the remote unit 102 may determine a response window having multiple subframes for transmitting an acknowledgement corresponding to the data. The remote unit 102 may transmit the acknowledgement within the response window. Thus, the acknowledgement may be transmitted during a time period longer than a single subframe to facilitate multiple attempts by the remote unit 102 to transmit the acknowledgement to the device because of times in which LBT may be unsuccessful.

Figure 2:
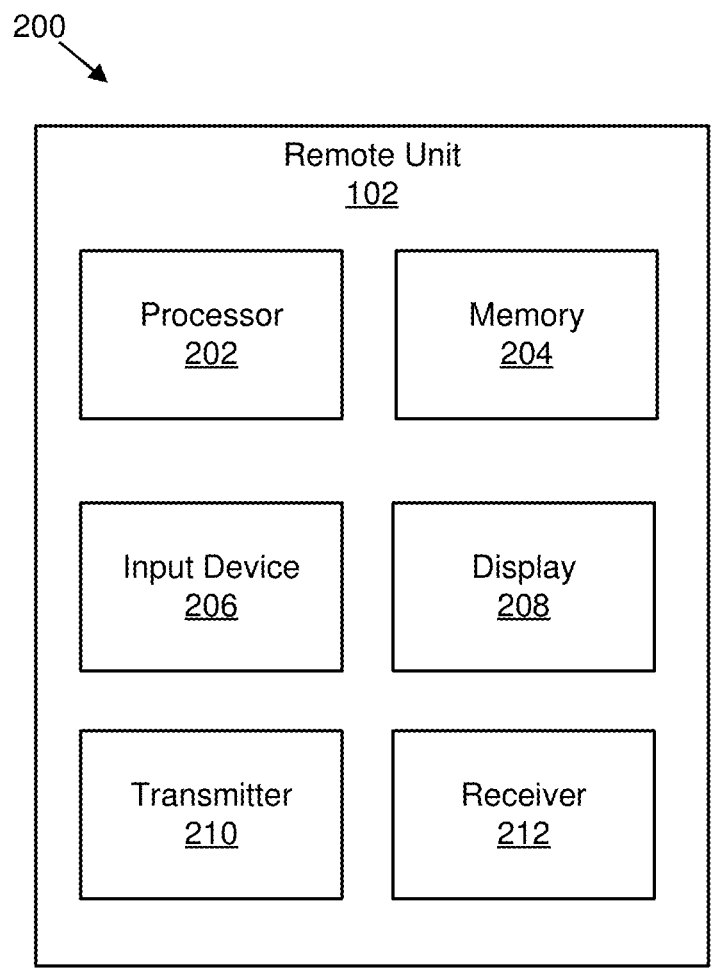
FIG. 2 is a schematic block diagram illustrating one embodiment of an apparatus that may be used for transmitting a data acknowledgment.

FIG. 2 depicts one embodiment of an apparatus 200 that may be used for transmitting a data acknowledgment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine a response window having multiple subframes for transmitting an acknowledgement corresponding to the data.

For example, the response window may be considered a HARQ-ACK feedback opportunity window for HARQ-ACK transmission in the UL of an unlicensed carrier. In one embodiment, for a data (e.g., in the form of a PDSCH TB) received in a subframe n, its corresponding HARQ-ACK may be fed back in one subframe within the HARQ-ACK feedback opportunity window. In certain embodiments, the duration of the HARQ-ACK feedback opportunity window may be denoted as M subframes. In some embodiments, the value of M may be configured by higher layer signaling (e.g., RRC signaling) or fixed in a specification. Therefore, for a PDSCH transmitted in a subframe, its corresponding HARQ-ACK transmission may have a maximum of M transmission opportunities. In various embodiments, a HARQ-ACK feedback opportunity window may include a set of M consecutive subframes, while other embodiments may include a set of M non-consecutive subframes. In some embodiments, all or only part of the set of M subframes may be non-consecutive. For example, at least two of the subframes of the set of M subframes may be consecutive, while at least one subframe of the set of M subframes may not be consecutive with the at least two consecutive subframes.

In certain embodiments, LBT is performed by the remote unit 102 using the processor 202 before the possible transmission in each of the subframes within the HARQ-ACK feedback opportunity window. In some embodiments, within a HARQ-ACK feedback opportunity window corresponding to a HARQ-ACK, the first subframe for which LBT is successful is used to transmit one or more HARQ-ACKs. For example, assuming LBT for the first $(N-1)^{th}$ subframes in the HARQ-ACK feedback opportunity window fails and LBT for the $N^{th}$ subframe is successful, the remote unit 102 may transmit the HARQ-ACK in the $N^{th}$ subframe within the HARQ-ACK feedback opportunity window. If LBT is not successful for any of the M subframes within the HARQ-ACK feedback opportunity window corresponding to a HARQ-ACK, the remote unit 102 may not transmit that HARQ-ACK.

In certain embodiments, for an LBT procedure, some parameters may be generated (e.g., a random backoff counter for CCA checks) by the processor 202. Taking the random backoff counter for CCA checks as an example, in one embodiment, the random backoff counter may be generated once for a HARQ-ACK feedback opportunity window. In other words, for a HARQ-ACK feedback and its corresponding HARQ-ACK feedback opportunity window, a random backoff counter for CCA checks may be generated (e.g., with value $x_1$) for the LBT for the first subframe within the HARQ-ACK feedback opportunity window. If the LBT fails for the first subframe within the HARQ-ACK feedback opportunity window (e.g., the random backoff counter does not reach to 0 but reaches to a value $x_2 <= x_1$), the remote unit 102 continues the LBT procedure with the random backoff counter value $x_2$ for the second subframe within the HARQ-ACK feedback opportunity window, and so on for the rest of the subframes within the HARQ-ACK feedback opportunity window. Still using the random backoff counter for CCA checks as an example, in another embodiment, the random backoff counter is newly generated for each LBT procedure for each of the M subframes within the HARQ-ACK feedback opportunity window. In other words, the random backoff counter value for a second subframe within the HARQ-ACK feedback opportunity window is independently generated from the random backoff counter value for a first subframe within the HARQ-ACK feedback opportunity window.

In some embodiments, for a HARQ-ACK transmission corresponding to data received in a subframe n, a set of M subframes for the HARQ-ACK feedback opportunity window corresponding to the HARQ-ACK transmission may be defined. In one embodiment, for a HARQ-ACK transmission corresponding to data received in a subframe n, its corresponding HARQ-ACK feedback opportunity window includes a set of consecutive subframes (e.g., $\{n+x, n+x+1, \ldots, n+x+M-1\}$). In some embodiments, the value of x equals 4, while in other embodiments the value of x is equal to any suitable time period of delay from the subframe n where data is received to a first subframe in the HARQ-ACK feedback opportunity window. In another embodiment, for a HARQ-ACK transmission corresponding to data received in a subframe n, its corresponding HARQ-ACK feedback opportunity window includes a set of non-consecutive subframes (e.g., $\{n+x, n+x+2, \ldots, n+x+2M-2\}$). In one embodiment, the value of x equal 4, while in other embodiments the value of x is equal to any suitable time period of delay from the subframe n where data is received to a first subframe in the HARQ-ACK feedback opportunity window. Furthermore, in one embodiment for non-consecutive subframes that make up the HARQ-ACK feedback opportunity window, a TDD UL/DL configuration defining the subframe usage is indicated from a base unit 104 to a remote unit 102. Based on this, the remote unit 102 may know the uplink subframe positions that may be used to define the HARQ-ACK feedback opportunity window. In another embodiment for non-consecutive subframes that make up the HARQ-ACK feedback opportunity window, a bitmap defining M subframes from the available uplink subframes to make up the HARQ-ACK feedback opportunity window is indicated from a base unit 104 to a remote unit 102. Based on this, the remote unit 102 may know the subframe positions used to define the HARQ-ACK feedback opportunity window.

In certain embodiments, the HARQ-ACK feedback opportunity window for multiple different HARQ-ACKs corresponding to data received in multiple different subframes may overlap. Accordingly, multiple HARQ-ACKs may be transmitted in a single subframe (e.g., the same subframe). In various embodiments, to transmit the multiple HARQ-ACKs in one subframe, different HARQ-ACK transmission schemes may be used. For example, the multiple HARQ-ACKs may be compressed (e.g., by time domain bundling or spatial bundling) to reduce the HARQ-ACK payload size. In some embodiments, the multiple HARQ-ACKs may not be bundled. For example, PUCCH formats 1a/1b/2/3/4/5 defined by 3GPP LTE may be used to transmit the multiple HARQ-ACKs in a single subframe. As discussed, by transmitting HARQ-ACKs during the HARQ-ACK feedback opportunity window having more than one subframe, HARQ-ACKs may have a high opportunity for being transmitted to a base unit 104, which consequently improves the DL throughput performance compared to conditions where HARQ-ACKs have only one possible subframe for transmission.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit an acknowledgement to the base unit 104 within a response window. In certain embodiments, the receiver 212 may be used to receive data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
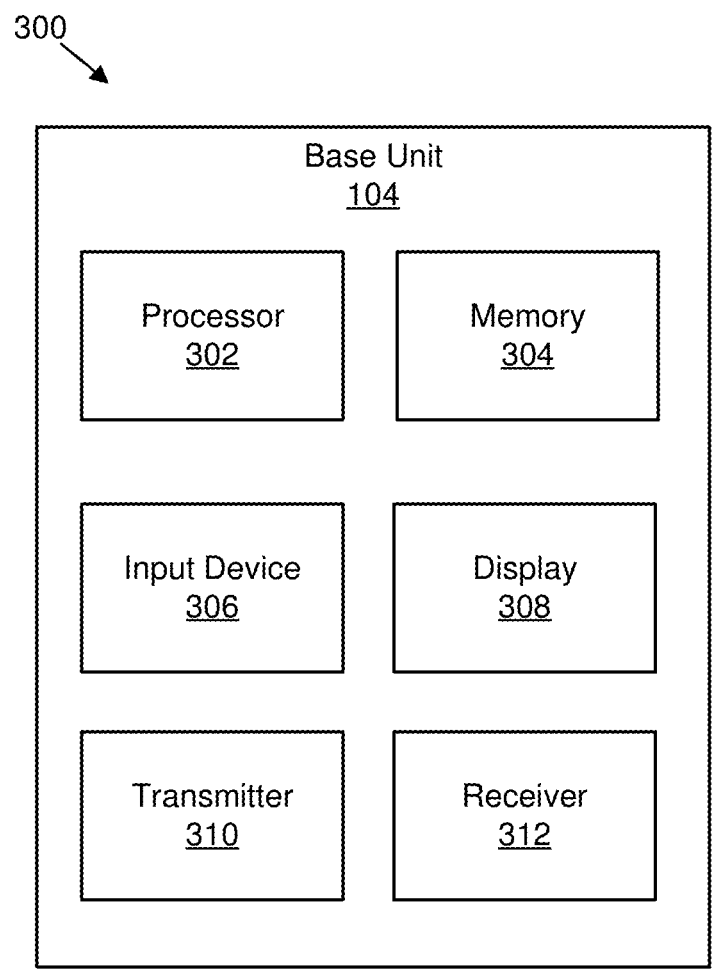
FIG. 3 is a schematic block diagram illustrating one embodiment of an apparatus that may be used for receiving a data acknowledgment.

FIG. 3 depicts one embodiment of an apparatus 300 that may be used for receiving a data acknowledgment. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine a response window having multiple subframes for receiving an acknowledgement corresponding to the data from a remote unit 102.

The transmitter 310 is used to provide DL communication signals to the remote unit 102 and the receiver 312 is used to receive UL communication signals from the remote unit 102. In certain embodiments, the transmitter 310 is used to transmit data on a carrier to a remote unit 102. In one embodiment, the receiver 312 is used to receive an acknowledgement from a remote unit 102 during a response window. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
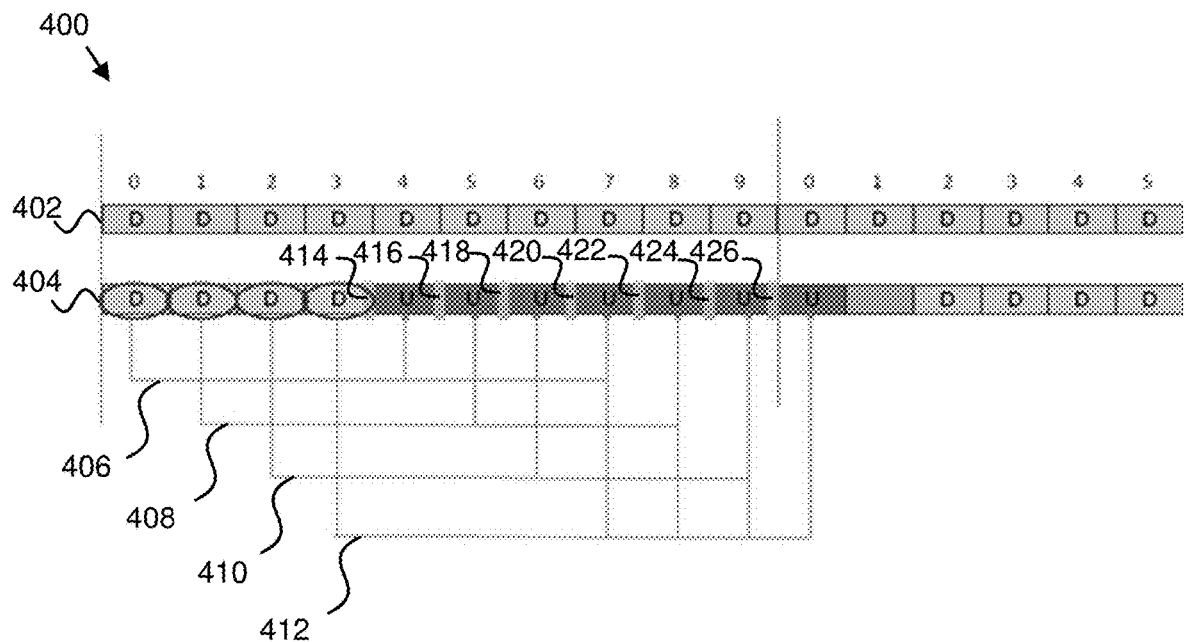
FIG. 4 illustrates one embodiment of a response window for transmitting a data acknowledgment.

FIG. 4 illustrates one embodiment of a response window for transmitting a data acknowledgment. Specifically, communications 400 include UL/DL data structure 402 for a primary cell and UL/DL data structure 404 for an LAA secondary cell. HARQ-ACKs 406, 408, 410, and 412 correspond to PDSCH DL data in subframes 0, 1, 2, and 3 of the UL/DL data structure 404, respectively. In this embodiment, M is configured to 4. Therefore, for a HARQ-ACK corresponding to data received in subframe n, its corresponding HARQ-ACK feedback opportunity window (e.g., response window) includes a set of 4 consecutive subframes {n+4, n+5, n+6, n+7}. Accordingly, for PDSCH in subframe 0 of the UL/DL data structure 404, the corresponding HARQ-ACK 406, may be transmitted in a window that includes subframes 4, 5, 6, 7 of the UL/DL data structure 404. LBTs 414, 416, 418, 420, 422, 424, and 426 are performed prior to each potential UL in the UL/DL data structure 404. If LBT 414 for transmission in subframe 4 of the UL/DL data structure 404 is successful, HARQ-ACK 406 is transmitted in subframe 4. If LBT 414 fails, the remote unit 102 performs LBT 416 for subframe 5 and transmit HARQ-ACKs 406 and 408 in subframe 5 of the UL/DL data structure 404 if the LBT for transmission in subframe 5 is successful, and so forth. In one embodiment, each of the LBTs 414, 416, 418, 420, 422, 424, and 426 for possible HARQ-ACK transmission in a subframe m may be performed in subframe m. In another embodiment, each of the LBTs 414, 416, 418, 420, 422, 424, and 426 for possible HARQ-ACK transmission in a subframe m may be performed in subframe m−1.

Figure 5:
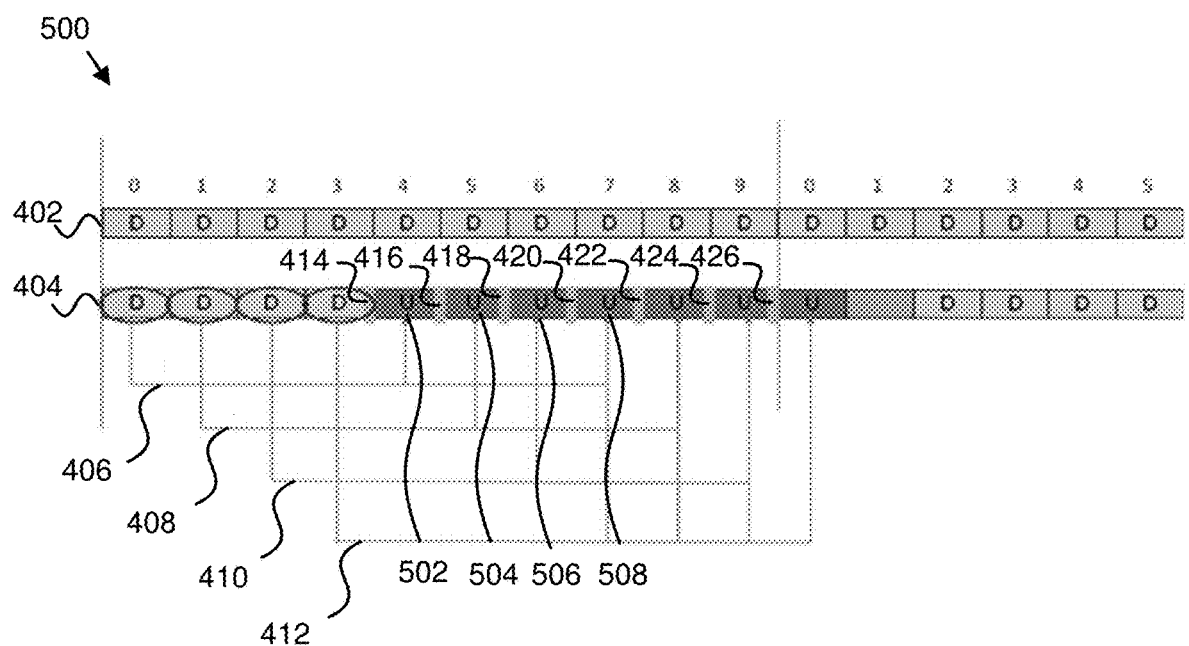
FIG. 5 illustrates another embodiment of a response window for transmitting a data acknowledgment.

FIG. 5 illustrates another embodiment of a response window for transmitting a data acknowledgment. Specifically, communications 500 again include the UL/DL data structure 402 for a primary cell and the UL/DL data structure 404 for an LAA secondary cell. In this embodiment, it is assumed that LBTs 414, 416, and 418 for transmission in subframes 4, 5 and 6 are not successful (e.g., due to the channel being occupied by other LAA nodes or Wi-Fi). Accordingly, no HARQ-ACKs are transmitted in subframes 502, 504, and 506 (e.g., subframes 4, 5, and 6). Moreover, LBT 420 for transmission in subframe 7 is successful. Therefore, the remote unit 102 may transmit HARQ-ACKs 406, 408, 410, and 412 in subframe 7 because subframe 7 is part of the response window for all HARQ-ACKs 406, 408, 410, and 412. If the LBT 420 in subframe 7 were to fail, then the remote unit 102 would no longer attempt to transmit HARQ-ACK 406 because four transmission opportunities for HARQ-ACK 406 would have already been made (e.g., the response window would be expired). From the perspective of a base unit 104, the base unit 104 may expect to receive HARQ-ACK 406 in any subframe within the response window (e.g., subframe 4 to subframe 7). If the base unit 104 cannot detect the HARQ-ACK 406 corresponding to the LAA PDSCH in subframe 0 in any subframes within the response window, the base unit 104 may retransmit the PDSCH in a later DL transmission. If any HARQ-ACK 406, 408, 410, and 412 has been transmitted within its corresponding response window, then the remote unit 102 may not perform LBT and may not retransmit the respective HARQ-ACK in the remaining subframes within its corresponding response window.

Figure 6:
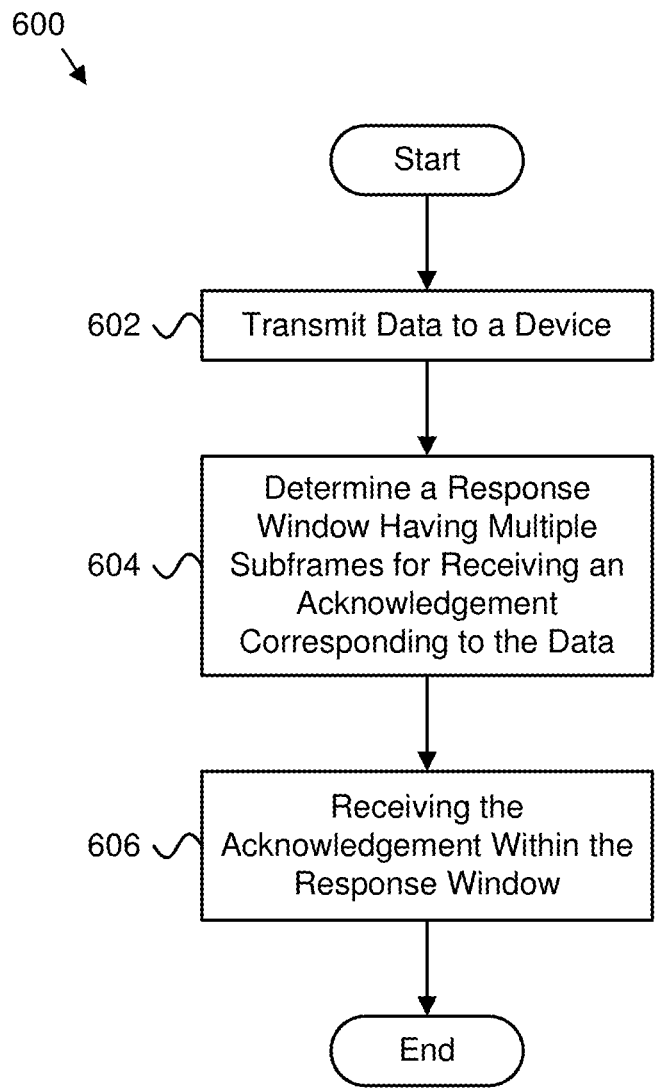
FIG. 6 is a schematic flow chart diagram illustrating one embodiment of a method for receiving a data acknowledgment.

FIG. 6 is a schematic flow chart diagram illustrating one embodiment of a method 600 for receiving a data acknowledgment. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 data to a device (e.g., remote unit 102). The method 600 may also include determining 604 a response window including multiple subframes for receiving an acknowledgement corresponding to the data. In one embodiment, the multiple subframes may be consecutive subframes, while in another embodiment, the multiple subframes may be non-consecutive subframes. In various embodiments, a number of subframes of the response window is fixed or configured by higher layer signaling. In certain embodiments, determining 604 the response window may include determining a time period of delay from the subframe where the data is transmitted to a first subframe within the response window. The method 600 may include receiving 606 the acknowledgement within the response window, and the method 600 may end. In certain embodiments, the acknowledgment includes a positive acknowledgement ("ACK") or a negative acknowledgement ("NAK").

Figure 7:
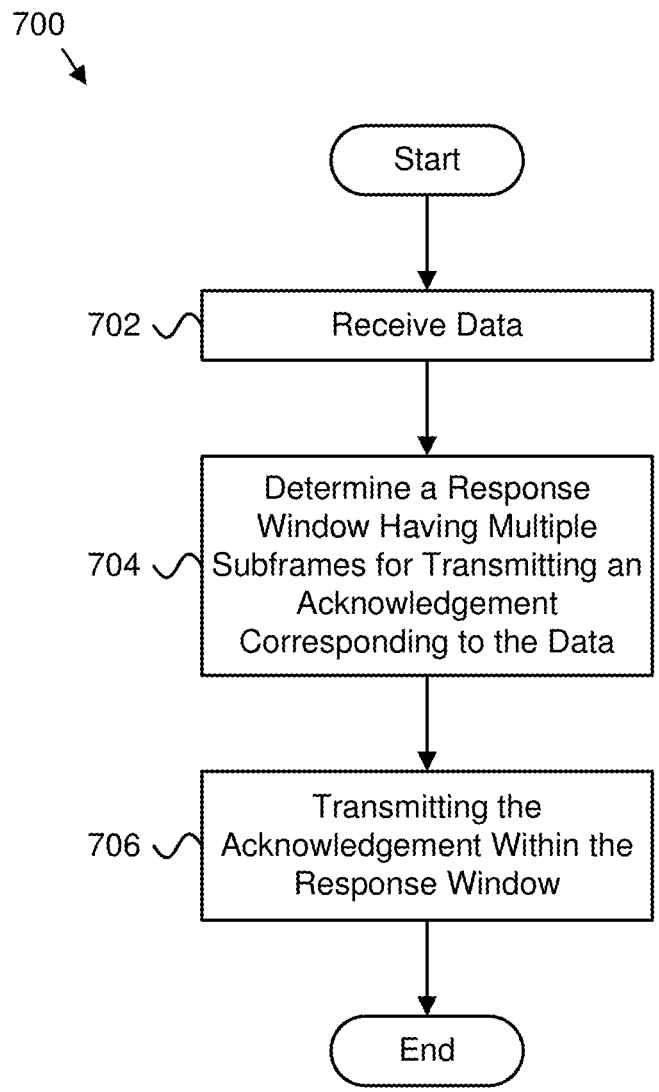
FIG. 7 is a schematic flow chart diagram illustrating one embodiment of a method for transmitting a data acknowledgment.

FIG. 7 is a schematic flow chart diagram illustrating one embodiment of a method 700 for transmitting a data acknowledgment. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 data from a device (e.g., base unit 102). The method 700 may also include determining 704 a response window including multiple subframes for transmitting an acknowledgement corresponding to the data. In one embodiment, the multiple subframes may be consecutive subframes, while in another embodiment, the multiple subframes may be non-consecutive subframes. In various embodiments, a number of subframes of the response window is fixed or configured by higher layer signaling. In certain embodiments, determining 704 the response window may include determining a time period of delay from the subframe where the data is received to a first subframe within the response window. The method 700 may include transmitting 706 the acknowledgement within the response window, and the method 700 may end.

In certain embodiments, the acknowledgment includes a positive acknowledgement ("ACK") or a negative acknowledgement ("NAK"). In one embodiment, the method 700 may include performing a LBT before transmitting the acknowledgement. In some embodiments, transmitting 706 the acknowledgement within the response window includes transmitting the acknowledgement in a subframe within the response window immediately following a subframe in which LBT is successful. In various embodiments, transmitting 706 the acknowledgement within the response window includes transmitting the acknowledgement in a subframe within the response window in which LBT is successful.

In one embodiment, the method 700 may include generating a random backoff counter for a LBT in a first subframe within the response window and continuing to count down the random backoff counter for the LBT in a second subframe within the response. In some embodiments, determining 704 the response window includes determining multiple response windows with each response window of the multiple response windows corresponding to a respective portion of the data, and transmitting 706 an acknowledgement for each respective portion of the data within a corresponding response window of the multiple response windows. In certain embodiments, the method 700 includes transmitting the acknowledgement for each respective portion of the data together in a subframe after successfully performing a LBT. In various embodiments, the method 700 includes transmitting a common acknowledgement for each respective portion of the data (e.g., one acknowledgement that collectively responds to each portion of the data) in a subframe after successfully performing a LBT.

While embodiments described herein may be described for HARQ-ACK transmission or reception on a carrier of an unlicensed spectrum. The disclosed embodiments may be equally applicable for HARQ-ACK transmission or reception on a carrier of a licensed spectrum.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a receiver that receives a first physical downlink shared channel at a first time;
a processor that determines a first transmission opportunity for transmitting first hybrid automatic repeat request-acknowledgement feedback corresponding to the first physical downlink shared channel, wherein the first hybrid automatic repeat request-acknowledgement feedback has multiple transmission opportunities and the first transmission opportunity is at a second time; and
a transmitter that transmits the first hybrid automatic repeat request-acknowledgement feedback in the first transmission opportunity in response to a listen-before-talk for the first transmission opportunity being successful.

2. The apparatus of claim 1, wherein the receiver further receives information indicating an offset time from the first time to the second time.

3. The apparatus of claim 2, wherein the offset time is a duration from the first time at which the first physical downlink shared channel is received to the first transmission opportunity.

4. The apparatus of claim 1, wherein the transmitter does not transmit the first hybrid automatic repeat request-acknowledgement feedback in the first transmission opportunity in response to the listen-before-talk for the first transmission opportunity failing.

5. The apparatus of claim 4, wherein:
the receiver further receives a second physical downlink shared channel at a third time;

the processor determines a second transmission opportunity for transmitting second hybrid automatic repeat request-acknowledgement feedback corresponding to the second physical downlink shared channel, wherein the second hybrid automatic repeat request-acknowledgement feedback has multiple transmission opportunities and the second transmission opportunity is at a fourth time; and the transmitter transmits both the first hybrid automatic repeat request-acknowledgement feedback and the second hybrid automatic repeat request-acknowledgement feedback in the second transmission opportunity in response to a listen-before-talk for the second transmission opportunity being successful.

6. The apparatus of claim 5, wherein the receiver further receives information indicating an offset time from the third time to the fourth time.

7. The apparatus of claim 6, wherein the offset time is a duration from the third time at which the second physical downlink shared channel is received to the second transmission opportunity.

8. A method comprising:
receiving a first physical downlink shared channel at a first time;
determining a first transmission opportunity for transmitting first hybrid automatic repeat request-acknowledgement feedback corresponding to the first physical downlink shared channel, wherein the first hybrid automatic repeat request-acknowledgement feedback has multiple transmission opportunities and the first transmission opportunity is at a second time; and
transmitting the first hybrid automatic repeat request-acknowledgement feedback in the first transmission opportunity in response to a listen-before-talk for the first transmission opportunity being successful.

9. The method of claim 8, further comprising receiving information indicating an offset time from the first time to the second time.

10. The method of claim 9, wherein the offset time is a duration from the first time at which the first physical downlink shared channel is received to the first transmission opportunity.

11. The method of claim 8, further comprising not transmitting the first hybrid automatic repeat request-acknowledgement feedback in the first transmission opportunity in response to the listen-before-talk for the first transmission opportunity failing.

12. The method of claim 11, further comprising:
receiving a second physical downlink shared channel at a third time;
determining a second transmission opportunity for transmitting second hybrid automatic repeat request-acknowledgement feedback corresponding to the second physical downlink shared channel, wherein the second hybrid automatic repeat request-acknowledgement feedback has multiple transmission opportunities and the second transmission opportunity is at a fourth time; and
transmitting both the first hybrid automatic repeat request-acknowledgement feedback and the second hybrid automatic repeat request-acknowledgement feedback in the second transmission opportunity in response to a listen-before-talk for the second transmission opportunity being successful.

13. The method of claim 12, further comprising receiving information indicating an offset time from the third time to the fourth time.

14. The method of claim 13, wherein the offset time is a duration from the third time at which the second physical downlink shared channel is received to the second transmission opportunity.

15. An apparatus comprising:
a transmitter that transmits a first physical downlink shared channel at a first time;
a processor that determines a first transmission opportunity for receiving first hybrid automatic repeat request-acknowledgement feedback corresponding to the first physical downlink shared channel, wherein the first hybrid automatic repeat request-acknowledgement feedback has multiple transmission opportunities and the first transmission opportunity is at a second time; and
a receiver that attempts to receive the first hybrid automatic repeat request-acknowledgement feedback in the first transmission opportunity.

16. The apparatus of claim 15, wherein the transmitter further transmits information indicating an offset time from the first time to the second time.

17. The apparatus of claim 16, wherein the offset time is a duration from the first time at which the first physical downlink shared channel is transmitted to the first transmission opportunity.

18. The apparatus of claim 15, wherein:
the receiver does not receive the first hybrid automatic repeat request-acknowledgement feedback in the first transmission opportunity;
the transmitter further transmits a second physical downlink shared channel at a third time;
the processor determines a second transmission opportunity for receiving second hybrid automatic repeat request-acknowledgement feedback corresponding to the second physical downlink shared channel, wherein the second hybrid automatic repeat request-acknowledgement feedback has multiple transmission opportunities and the second transmission opportunity is at a fourth time; and
the receiver further attempts to receive both the first hybrid automatic repeat request-acknowledgement feedback and the second hybrid automatic repeat request-acknowledgement feedback in the second transmission opportunity.

19. The apparatus of claim 18, wherein the transmitter further transmits information indicating an offset time from the third time to the fourth time.

20. The apparatus of claim 19, wherein the offset time is a duration from the third time at which the second physical downlink shared channel is transmitted to the second transmission opportunity.

* * * * *